United States Patent [19]

Bartlett

[11] 3,845,797
[45] Nov. 5, 1974

[54] STUMP SPLITTER

[76] Inventor: Raymond H. Bartlett, 604 N. Overlook Dr., Vancouver, Wash. 98665

[22] Filed: Aug. 9, 1973

[21] Appl. No.: 387,178

Related U.S. Application Data

[63] Continuation-in-part of Ser. No. 333,968, Feb. 20, 1973, abandoned.

[52] U.S. Cl............................. 144/2 N, 144/34 E
[51] Int. Cl............................................ B27c 9/00
[58] Field of Search........ 144/2 N, 2 R, 34 E, 34 R, 144/3 D, 2 Z, 309 AC, 193

[56] References Cited
UNITED STATES PATENTS

| | | | |
|---|---|---|---|
| 2,820,493 | 1/1958 | Davis | 144/2 N |
| 3,620,271 | 11/1971 | Loyer | 144/2 N |
| 3,721,281 | 3/1973 | Bartlett | 144/2 N |
| 3,739,823 | 6/1973 | Bartell | 144/2 N |

Primary Examiner—Andrew R. Juhasz
Assistant Examiner—W. D. Bray
Attorney, Agent, or Firm—Eugene M. Eckelman

[57] ABSTRACT

A splitting device mounted on and operated from a tractor or other ground vehicle and including a header which can be raised, lowered or tipped. The header rotatably supports a substantially straight elongated blade supporting frame. A pair of arms are hingedly connected at their upper ends to the top of the blade supporting frame and carry opposed slicing blades at their lower ends. A pair of double acting hydraulic cylinders at the bottom ends of the sides of the blade supporting frame are connected to the arms intermediate the ends thereof for moving the arms and therewith the blades toward and away from each other for splitting stumps. Hydraulic operated means are provided for rotating the knife supporting frame on a vertical axis, and for raising, lowering or tipping the header. Movable lock members are mounted on the knife supporting frame for engagement with a portion of the header when it is desired that the knife supporting frame be anchored against rotation relative to the header in a laterally disposed position. A power driven ejecting rod is included in the blade supporting frame for forcing the slicing blades out of the stump if they should become stuck.

11 Claims, 13 Drawing Figures

STUMP SPLITTER

CROSS-REFERENCE TO RELATED APPLICATIONS

This application is a continuation-in-part of application Ser. No. 333,968, filed Feb. 20, 1973, now abandoned, for Stump Splitter.

BACKGROUND OF THE INVENTION

A problem encountered in the grading and building of new roads is that it is difficult to remove stumps which are too large to be bulldozed out or otherwise removed by ordinary stump pullers. The use of dynamite usually is not possible and furthermore is relatively expensive and hazardous. In my application Ser. No. 184,075, filed Sept. 27, 1971, I provide a stump splitter which utilizes a pair of knives driven together and apart in a stump splitting function by double acting hydraulic cylinders supported on a U-shaped yoke member carried by a tractor or other ground vehicle. While such device operates satisfactorily in most instances, the U-shaped frame which supports the splitting blades limits the downward reaching of the knives relative to the stump. It has been found that by positioning the bottom ends of the knives rather deeply into the soil on opposite sides of the stump they can serve to cut through at least as low as the heart of the stump, and make the split sections very easy to remove. With my former structure, this deep penetration is not always possible.

Another problem encountered in the grading and building of new roads is that the area generally has considerable trash thereon which requires sawing or otherwise reducing it to smaller pieces so that it can be hauled away, burned, or otherwise disposed of.

SUMMARY OF THE INVENTION

According to the present invention and forming an important objective thereof, there is provided stump splitting structure which employs a substantially straight frame from which the splitting blades depend, with substantially the full length of the blades being disposed in a plane below the lowest point of the blade supporting frame, whereby the blades can be pushed down into the earth on opposite sides of the stump and engage the stump at least as low as the heart thereof.

Another object of the invention is to provide a stump splitter of the type described wherein the cutting edges of the splitting blades are disposed at a predetermined angle such that when the blades are moved together on pivot supports therefor, the said cutting edges are substantially parallel and together, thus making the apparatus useful as a trash cutter as well.

Another feature of the present structure is that it employs an ejecting foot operable vertically by a double acting cylinder in the knife supporting frame and capable of pushing down on a stump for forcing the splitting blades out of the stump in the event that the latter should get stuck. This ejecting foot also is usable with the knife blades for cutting up material into smaller pieces.

The invention will be better understood and additional objects and advantages will become apparent from the following description taken in connection with the accompanying drawings which illustrate a preferred form of the device.

DETAILED DESCRIPTION OF PREFERRED EMBODIMENTS

Figure 1:
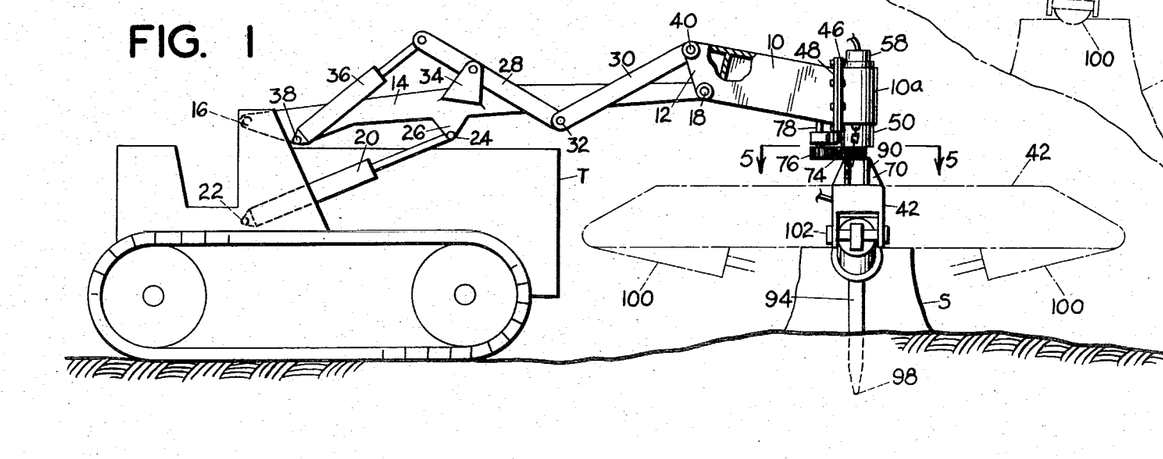
FIG. 1 is a side elevational view showing a first form of the present splitter mounted on a caterpiller-type tractor and performing a splitting operation on a stump, the blade supporting frame being shown in full lines positioned transversely with respect to the longitudinal center line of the tractor and being shown in phantom lines rotated 90 degrees for performing a second or crosswise splitting action on the stump.
Figures 2, 6:
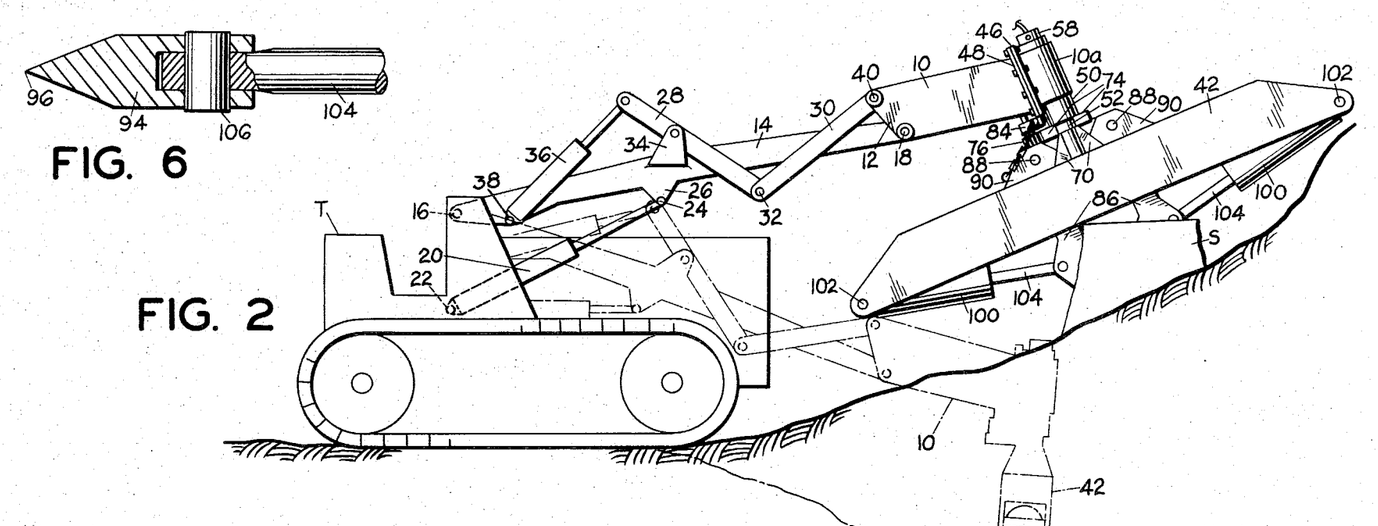
FIG. 2 is a similar side elevational view illustrating in full lines a position of the splitter for performing a splitting action on a stump which is located on a ground surface sloping upwardly from the ground on which the tractor is resting, and illustrating in phantom lines another position of the splitter in the performance of the splitting action on a stump located on a ground surface sloping downwardly from the ground on which the tractor is resting and with the yoke member with the splitting blades shown rotated 90 degrees.
FIG. 6 is an enlarged fragmentary sectional view taken one the line 6—6 of FIG. 3.

In FIGS. 1 and 2, the tractor on which a first embodiment of the splitting device is mounted and from which it is operated is indicated by the reference character T.

The device includes a header, indicated in general by the reference numeral 10 which is substantially box-shaped in construction of welded steel plates and having rearward extensions 12 to which supporting pairs of articulated arm assemblies and support arms, to be described, are connected. These articulated arm assemblies and support arms for the header are identical and only the near side as shown in FIGS. 1 and 2 will be described.

A main arm 14, FIGS. 1 and 2, has its rear end hingedly mounted at 16 on the upper portion of a housing on the tractor, and has its forward end hingedly connected to the header at a lower point 18. A double acting hydraulic cylinder 20 is pivotally attached at 22 to the tractor and the end of its piston rod is pivotally connected at 24 to a depending ear 26 on the underside of the main arm 14. Thus, the operation of the hydraulic cylinder 20 for the supporting arm 14 in each pair of the articulated arm assemblies can cause the front end of the arm and therewith the header 10 to be raised or lowered with respect to the tractor.

Each articulated arm assembly also includes a pair of links 28 and 30 pivotally connected together at 32. The first link 28 of the pair is pivotally mounted near its center on a bracket 34 secured on the corresponding main arm 14. The rear end of this first link 28 is pivotally connected to the piston rod of a double acting hydraulic cylinder 36 pivotally attached to the tractor at 38. The front end of the second link 30 is pivotally connected at 40 to a rear top portion of the header extension 12. It will be apparent from this arrangement that, with the operation of the two hydraulic cylinders 20 and 36 in each of the pair of articulated arm assemblies, the header member 10 of the device not only can be raised or lowered, but also can be tilted upwardly or downwardly as illustrated in FIGS. 1 and 2.

Figure 3:
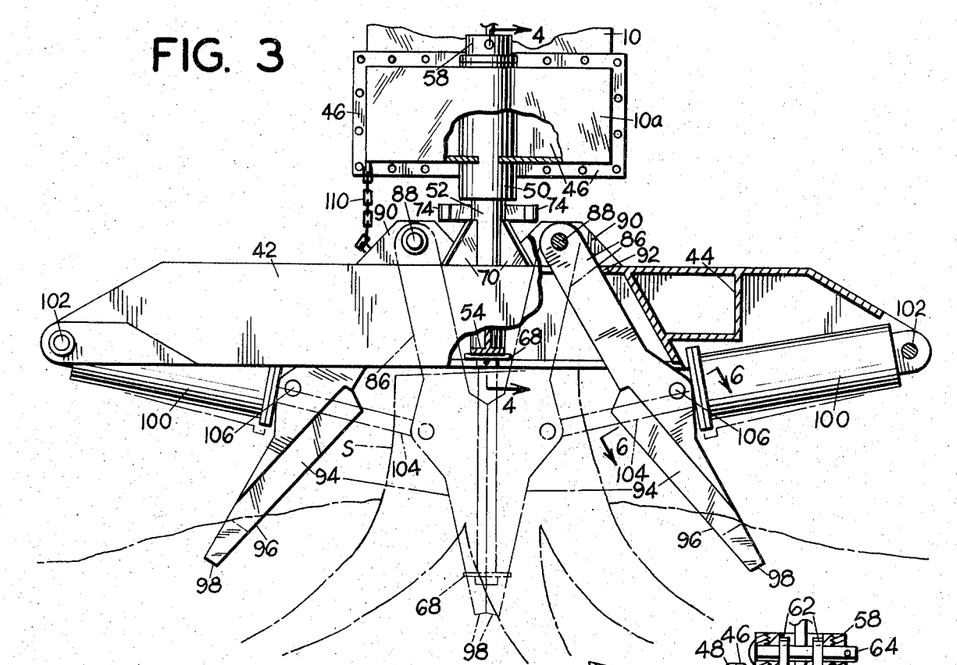
FIG. 3 is an enlarged fragmentary front elevation of the splitter showing the blade supporting frame positioned transversely with respect to the tractor, the tractor and supporting assemblies being omitted and with portions of the frame being broken away and shown in section for clarity; the stump in the process of being split being indicated in phantom lines and the withdrawn position of the arms and splitting blades being shown in full lines.

An elongated, inverted channel-shaped member 42, comprising the blade supporting frame, is rotatably supported in depending relation on the forward portion of the header 10. The blade supporting frame 42 is formed of heavy welded steel plates, FIGS. 3 and 4, and is substantially straight throughout its length. It has transverse reinforcing walls 44 as needed, and these walls are disposed inwardly from the ends, leaving the bottom of the frame 42 open adjacent the ends. The frame 42 is of a length sufficient to support splitting blades, to be described, on opposite sides of a stump when the frame 42 is set down over a stump. In FIGS. 1, 2 and 3, the frame 42 is shown in position for splitting a stump the stump being indicated by the reference S.

Figures 4, 5:
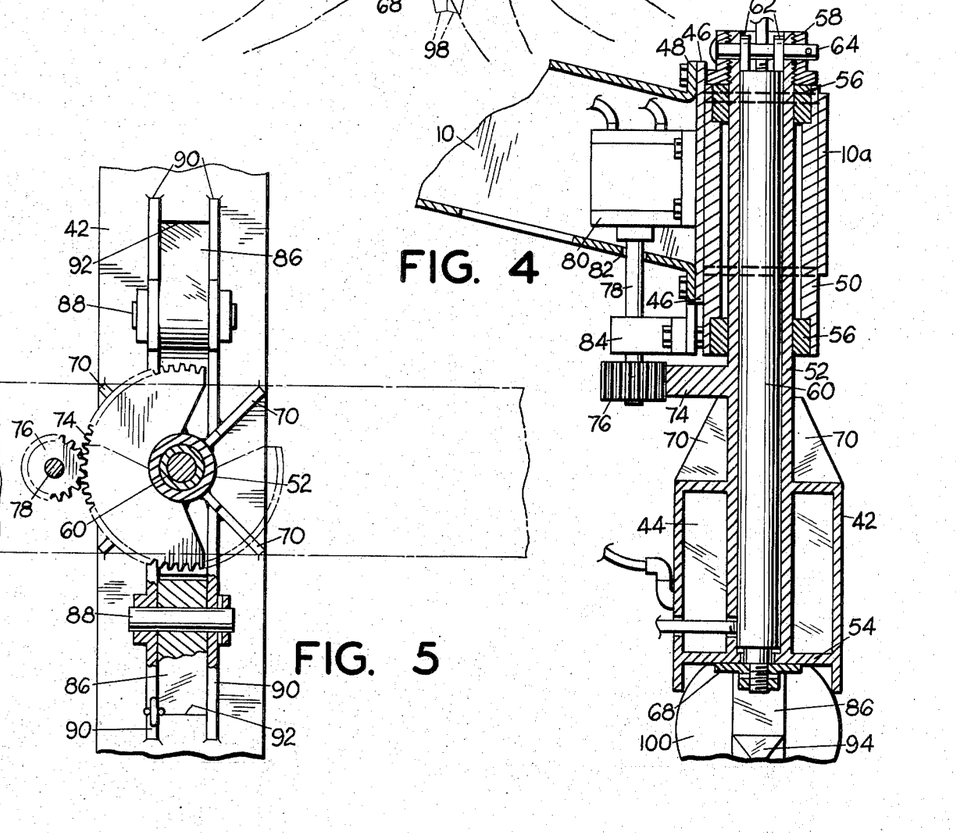
FIG. 4 is an enlarged fragmentary sectional view taken on the line 4—4 of FIG. 3.
FIG. 5 is a fragmentary sectional view taken on the line 5—5 of FIG. 1.

With particular reference to FIGS. 3, 4 and 5, the front end of header 10 includes a box-like extension or head 10a having a peripheral flange on its back wall bolted to a flange 48 on the front of header 10. A tubular support 50 is integrated with the header extension 10a, such as by welding to the inner surfaces of the front and rear walls of such extension. The lower end of tubular support 50 projects below the bottom of the extension 10a and the upper end thereof also projects above the top of such extension. A tubular neck 52 extends down through the top wall of blade supporting frame 42 and is secured integrally thereto, namely, by welded connection to the top wall thereof and to lateral webs 54 adjacent the bottom. The tubular neck 52 extends upwardly in the support 50 and is engaged in suitable bearings 56 in such support 50 for rotatable engagement. The neck 52 projects above the support 50 and has a nut 58 threaded on its upper end which has rotatable supported engagement with the upper end of the support 50 to allow rotation of the neck 52 and the blade supporting frame 42.

Disposed in the tubular neck 52 is a double acting hydraulic cylinder 60 having a pair of upright ears 62 on its upper end receiving a cross pin 64 in the nut 58 which anchors the cylinder 60 vertically. A bottom projecting end of the piston rod from cylinder 60 has an ejecting foot 68 thereon the purpose of which will be later described. As best seen in FIG. 4, the bottom end of tubular neck 52 at its lateral webs 54 is disposed slightly above the bottom edge of frame 42 so that the foot 68 when fully retracted is above such bottom edge. Vertical webs 70 are secured between the frame 42 at the top thereof and the neck 52 for reinforcement.

A partial ring gear 74 extending for at least 180° is welded on the rearward side of neck 52 and has meshing engagement with a drive pinion 76 secured on a vertical shaft 78 from a reversible hydraulic motor 80. Motor 80 is secured to the back wall of header extension 10a inside the header 10, its shaft projecting down through an aperture 82 in the bottom of header 10. This shaft has journaled engagement in a bearing 84 secured on the rear side of support 50. Operation of the motor 80 will cause the blade supporting frame 42 to rotate with respect to the header and with respect to the tractor T.

A pair of downwardly extending blade carrying arms 86 have pivot connection 88 with respective ears 90 on the upper side of blade supporting frame 42, the latter frame having suitable openings 92 in its top wall to allow lateral working of the arms 86 on their pivot support. The lower ends of these arms are formed with opposed splitting blades or knives 94 thereon having inwardly directed cutting edges 96. In addition to the cutting edges 96, the bottoms of these blades taper from the sides into a sharpened bottom edge 98 which facilitates vertical insertion of the blades into the ground.

A pair of identical double acting cylinders 100, best shown in FIG. 3, have their outer ends pivotally supported on cross shafts 102 mounted in the bottom outer ends of the respective downwardly extending side portions of the blade supporting frame 42. These cylinders operate piston rods 104, FIG. 2, the outer ends of which are pivotally connected at 106 to the respective arms 86. The hydraulic cylinders 100 are arranged such that they operate in unison in opposite directions and consequently actuation of these cylinders will result in the arms 86, with their opposed splitting blades 94, moving either toward or away from each other as the case may be.

The various conduit and controls for the hydraulically operated cylinders for manipulating the arms 86 as well as the frame 42, cylinder 60, motor 80, and cylinders 20 and 36 are not shown and described in detail since such structure is old and well known in the art and the installation of such controls on a tractor, for example, has been found to present no particular problem. A chain 110 is connected between the head extension 10a and the frame 42 and is of selected length to prevent excess turning of the latter in order that the pinion 76 will not run off the gear 74.

The manner in which the splitter is operated to perform the desired splitting of a stump will be readily understood from FIGS. 1, 2 and 3 in the following brief description. That is, with the splitter mounted on the tractor in the manner illustrated, and with the header and yoke member in raised position, the operator on the tractor moves the tractor into the necessary proximity of the stump to be split. The pair of articulated arm assemblies are then operated to bring the header 10 and therewith the blade supporting frame 42 into position over the stump so that the latter frame is over the stump. Due to the maneuverability of the header, and also the blade supporting frame 42, as illustrated in FIG. 2, the said frame 42 can be positioned in the desired location relative to the stump regardless of the nature of the ground on which the stump is located. Usually the frame is lowered to rest on the stump, the arms 86 first being retracted.

The blades in being moved apart are positioned as desired such as in a fully retracted position as shown in FIG. 3 or at least to a position which allows them to straddle the stump. The frame 42 is then lowered to the desired position. In most cases, the stump is cut quite low and when the frame 42 is lowered so as to rest on top of the stump the weight of the frame 42 will push the bottom ends of the blades into the soil. The lower ends of the blades will thus be at least as low as the heart of the stump. The hydraulic cylinders controlling the splitting blades are then actuated to cause the blades to move toward each other from opposite sides of the stump, producing a splitting action lengthwise of the wood grain of the stump. The splitting blades are then withdrawn and the frame member 42 given a partial rotation and the splitting blades again operated. Generally, two splitting operations, approximately of 90° with respect to each other, will be sufficient. However, if necessary more splitting operations at less angularity with respect to each other can be performed to reduce the stump into smaller sections. When sufficient splitting of the stump has been accomplished the splitter is raised and moved from the spot and the sections of the stump with their respective root portions can be pulled out of the ground by means usually employed for such purposes. In some cases, it is not even necessary by using the present structure to utilize pulling means, since the present blades after having cut the stump below the heart thereof in several sections can be used as push or pull means by moving the tractor back and forth or pivoting the header 10 on pivot support 18 by cylinder 36 to remove the stump sections.

If the knives should become stuck in the stump, it is merely necessary for the operator to actuate the hydraulic cylinder 60. This drives the foot 68 into engagement with the top of the stump and forces the blades out.

It is preferred that the blades 94 be angled and movable as well such that when they are in their innermost position, the edges 96 are substantially parallel and together. This allows the present apparatus to serve another purpose, namely, to cut limbs or trash around the area.

Figures 7, 9, 11:
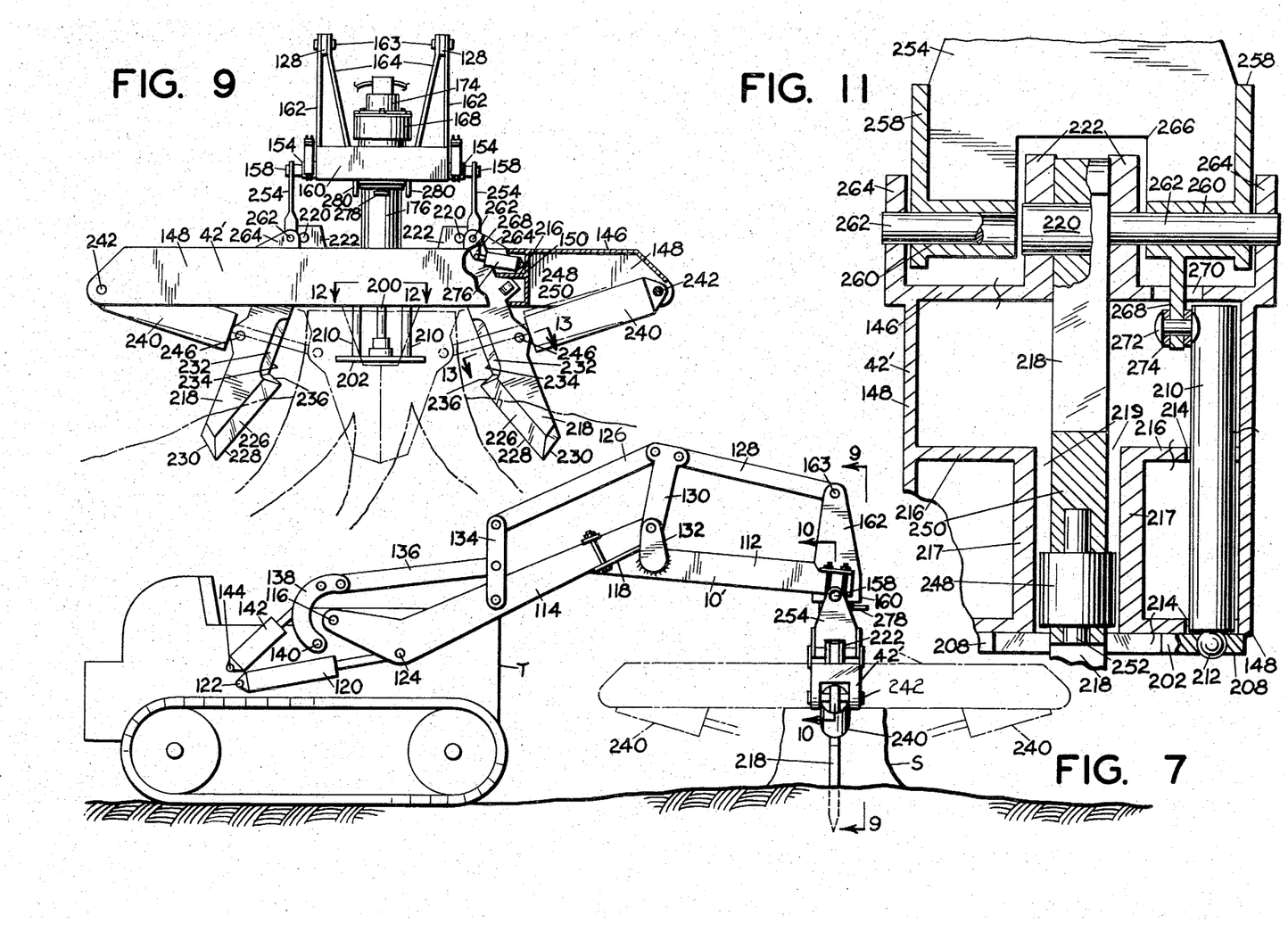
FIG. 7 is a side elevational view of a second embodiment of the invention, the blade supporting frame being shown in full lines positioned transversely with respect to the longitudinal center line of the tractor and shown in phantom lines rotated 90° for performing a second or crosswise splitting action on the stump.
FIG. 9 is an enlarged front elevational view taken on the line 9—9 of FIG. 7 with portions thereof broken away.
FIG. 11 is a fragmentary sectional view taken on the line 11—11 of FIG. 10, this view being partly broken away.
Figures 8, 12, 13:
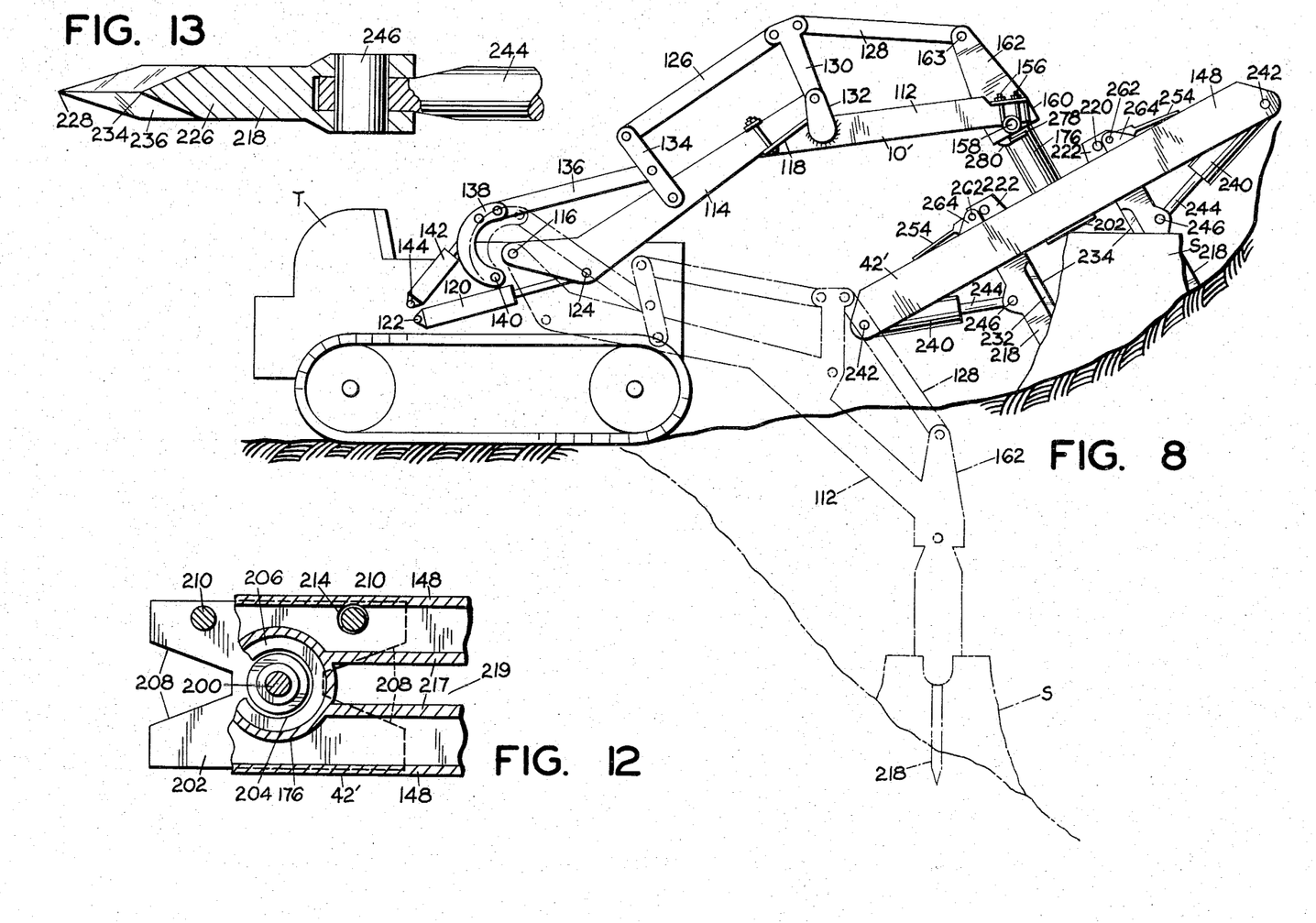
FIG. 8 is a view similar to FIG. 7 but showing the blade supporting frame positioned longitudinally of the tractor and also illustrating in full and phantom lines other functions of the embodiment of FIG. 7, namely, a versatility of the structure to cut stumps on uneven ground.
FIG. 12 is an enlarged fragmentary sectional view taken on the line 12—12 of FIG. 9.
FIG. 13 is an enlarged fragmentary sectional view taken on the line 13—13 of FIG. 9.

FIGS. 7–13 show a second embodiment of the invention which may be mounted on and operated by a tractor T, FIGS. 7 and 8. The device includes a header 10' comprising in part a pair of parallel, laterally spaced arms 112 secured at their rearward ends to respective articulated arm assemblies and support arms, to be described, these articulated arm assemblies and support arms being identical and therefore only the near side as shown in FIGS. 7 and 8 will be described.

A main arm 114 has its rearward end hingedly mounted at 116 on an upper portion of a housing on the tractor. The rearward end of arm 112 is connected removably to the forward end of arm 114 by clamp brackets 118. A double acting hydraulic cylinder 120 has a pivotal attachment 122 at its base end to the tractor, and the end of its piston rod is pivotally connected at 124 to the main arm 114. The operation of hydraulic cylinders 120 on the two sides of the tractor are capable of moving the arms and therewith the header 10' to raised or lowered positions with respect to the tractor such as to positions shown in full and phantom lines in FIGS. 7 and 8.

The articulated arm assemblies on each side also includes a pair of links 126 and 128 pivotally connected at adjacent ends to the upper end of an upstanding arm 130. The bottom end of arm 130 is pivotally connected to an upstanding ear 132 integral with the arm 112.

The rear end of link 126 has a pivot connection with the upper end of an upstanding lever 134 pivotally connected at its lower end to main arm 114. A rearwardly extending link 136 has its forward end pivotally connected to the lever 134 intermediate the upper and lower ends of the latter and its rearward end pivotally connected to a second link 138 which is arcuate in shape and which is pivotally connected at its lower end at 140 to the tractor. A double acting cylinder 142 has a pivotal attachment 144 at its base end to the tractor, and its piston rod is pivotally attached to link 138 intermediate the ends of the latter. From the arrangement described and with the operation of the two hydraulic cylinders 120 and 142 in each of the air of articulated arm assemblies, the header member 10' can be raised or lowered and the links 128 can be moved forward and rearwardly to pivot stump engaging means supported on the header, now to be described.

The blade supporting frame 42' is channel shaped in cross section and is substantially straight throughout its length. It has a top wall 146 and side walls 148, best seen in FIG. 11, as well as transverse reinforcing walls 150 on each side of center.

Figure 10:
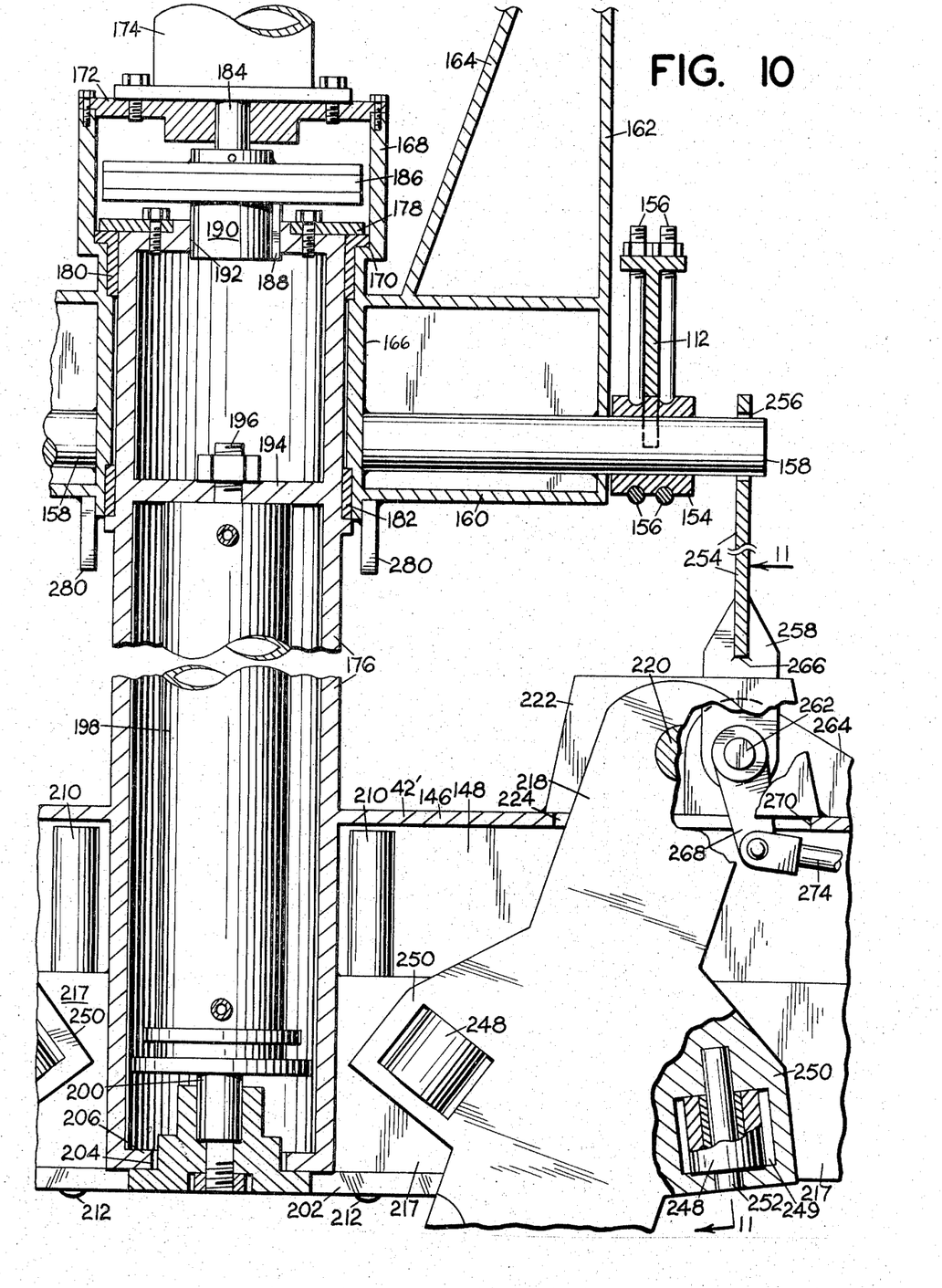
FIG. 10 is an enlarged fragmentary foreshortened sectional view taken on the line 10—10 of FIG 7.

With particular reference to FIGS. 7–11, the front ends of header arms 112 support bearings 154, best seen in FIG. 10, by means of a pair of U-bolts 156. Bearings 154 rotatably receive respective shaft segments 158 which project integrally from a transverse box-like head 160 having an integral upright plate-like lever arm 162 on each end thereof. These arms have pivot connections 163 at their upper ends with respective arms 128 and are reinforced by angled arms 164 extending between the head 160 and the pivot connections 163. Shaft segments 158 extend outwardly beyond the bearings 154 a short distance for a purpose to be described.

The head 160 includes a vertically disposed, integral tubular support 166 centrally therein. This tubular support has an upper enlarged portion 168 forming a shoulder 170 therein. The enlarged portion 168 supports a top plate 172 removably thereon, and this top plate in turn removably supports a motor and gear box drive unit 174 of a type well known in the art. This drive unit is capable of operation in either direction.

A tubular neck 176 has suspended mounting in the tubular support 166 by means of a support ring 178 removably secured to the top wall of the neck 176 and projecting outwardly beyond the sides of the neck for seated support on a bearing 180 engaged with shoulder 170. Another bearing 182 is mounted at the bottom of support 166 for rotative engagement of the neck relative to the head 160. A drive connection is established between an output shaft 184 of the motor and gear box drive unit 174 and the neck 176 by means of a friction clutch 186 connected to the output shaft and a key connection 188 between the output shaft 190 of the clutch and a top opening 192 in the top wall. By means of the structure thus far described, the neck 176 can be rotated relative to the head 160 and the entire unit, including the head, can be rotated on a horizontal axis by forward or rearward movement of links 128 by cylinders 142. Clutch 186 can slip in the event the frame 42' abuts against a solid object or other stop while the motor unit 174 is in operation.

The neck 176 extends down through the top wall 146 of blade supporting frame 42' to about the bottom of the latter and is secured integrally thereto, as by welding. This neck 176 has an integral cross wall 194 therein disposed up toward its upper end, and suspended by this wall in a bolt connection 196 is a double acting hydraulic cylinder 198. The piston rod 200 of such cylinder projects downwardly and has an ejecting foot 202 bolted thereon. The ejecting foot 202 projects through an opening 204 in a bottom wall 206 of the neck 176 and has laterally extending bifurcated portions 208 projecting a short distance transversely under the frame 42'. With particular reference to FIGS. 10, 11 and 12, a pair of guide rods 210 have a pivot connection 212, FIG. 11, at their lower ends to rearward and transversely outward portions of the ejector foot. These guide rods extend upwardly through guide openings 214 in horizontal upper and lower walls 216 of a longitudinal frame member 217 disposed within frame 42' adjacent a rearward portion thereof. A similar frame member 217 and walls 216 but without openings 214 is provided adjacent a forward portion of frame 42' with a space 219 being formed therebetween. The ejecting foot 202 can be moved downwardly by means of piston rod 200 and in such movement has firm guided relation by means of the guide rods 210.

A pair of downwardly extending blade carrying arms 218, FIGS. 7–11, have a pivot support 220 on respective ears 222 extending upwardly from the top of blade supporting frame 42', the latter frame having suitable openings 224, FIG. 10, in the top wall 146 to allow lateral working of the arms 218 on their pivot supports. Lower portions of these arms are formed with opposed blade or knife portions 226, FIG. 9, having inwardly directing cutting edges 228. In addition to the cutting edges 228, the bottoms of the blades taper from the sides into a sharpened bottom end 230 which facilitates insertion of the blades into the ground. In addition, an upper portion of each blade 218 has a cut-back or notch portion 232 with the inward facing edges 234 thereof as well as the upward facing shoulders 236 formed by the cut-back portions being sharpened.

A pair of double acting cylinders 240, best shown in FIGS. 8 and 9, have their outer ends pivotally supported on cross shafts 242 mounted in the outer ends of the respective downwardly extending side portions 148 of the blade supporting frame 42'. These cylinders operate piston rods 244 the outer ends of which are pivotally connected at 246 to their respective arms 218. The hydraulic cylinders 240 are arranged to operate in unison in opposite directions whereby upon actuation of the cylinders 240 the splitting blades 218 can be moved either toward or away from each other.

With particular reference to FIGS. 10, 11 and 12, the blade carrying arms 218 have guided movement in the space 219 between the walls 217 in the frame 42'. Each arm 218 has a pair of rollers 248 thereon, these rollers being disposed in openings 249 in lateral ear extensions 250 of the arms and being rotatable on upright shafts 252. The rollers 248 project beyond the face surfaces of the blades 218 and engage the walls 217 which maintain the cutting blades in a true lateral cutting direction without the possibility of twisting in a cut.

It is desirable at times that the blade supporting frame 42' be locked transversely of the header 10', namely, in the position shown in full lines in FIGS. 7 and 9, and for this purpose a pair of pivotal lock plates 254, FIGS. 7–11, having upper apertures 256, FIG. 10, are arranged in an upper pivoted position thereof and with the frame 42' in a transverse position, to lock over the projecting ends of shaft segments 158 by insertion of the latter into said apertures. Each lock plate 254 has an integral bottom U-shaped bracket 258, best seen in FIG. 11, having a transverse aperture 260 therethrough which receives a pair of shaft segments 262. These shaft segments have one end thereof mounted in the ears 222 for the knife supporting blades and the other end thereof mounted in ears 264 provided on the blade supporting frame 42' outward of ears 222. A center portion 266 of the brackets 258 and plates 254 are cut out to fit over a portion of the ears 222 in view of the adjacent positioning thereof.

A lever arm 268, FIGS. 10 and 11, extends integrally from each bracket 258 downward through an aperture 270 in the top wall 146 of the frame 42' and has a pivot connection 272 at its lower end with the end of a piston rod 274 of a double acting hydraulic cylinder 276, FIG. 9, pivotally attached at its base end to wall 150. The cylinders 276 can be activated to lower the lock plates 254 such as shown in FIG. 8 or to raise such lock plates as shown in FIGS. 7, 9, 10 and 11 for engagement of such lock plates with their shaft segments 158, these cylinders being arranged to operate in unison for simultaneous locking and unlocking of the plates 254. The engaged position of the lock plates with the shaft segments holds the blade supporting frame 42' rigidly in a transverse position which is useful in certain functions of stump removal, and for the purpose of so locking the frame 42', the operator merely rotates it to a transverse position by sight and then raises the plates 254.

It is desired that the blade supporting frame 42' be prevented from turning more than 90° in each direction from its transversely extending direction, and for this purpose the tubular supporting neck 176 has a projection 278 secured thereto FIGS. 7–10, which extends forward, considering the frame 42' to be disposed transversely, and the frame 160 has a pair of stop members 280 depending therefrom and arranged to be engaged by the projection 278 when the frame 42' is turned lengthwise of the tractor in either direction of rotation.

The apparatus is utilized to remove a stump substantially in the manner described in connection with the first embodiment, namely, the frame 42' is placed over a stump with the blades open and the blades are used to slice the stump from one or more directions under power from the cylinders 240. The present embodiment has an important advantage in that once the stump has been cut one or more times, the frame 42' can be disposed transversely of the header 10' and with the lock plates 254 in locked position on the shaft segments 158, the stump segments being engaged by the blades left in cutting position can be forcefully rooted out by forward or reverse movement of the tractor or by pivotal movement of the lever arms 162 under power from fluid operated cylinders 142. The locked position of the frame 42' makes it substantially rigid with the header to relieve the support neck 176 from strains. The location of the pivot support 154, being disposed directly over the frame 42', provides a good leverage for uprooting the stump segments by the use of cylinders 142. When turning the frame 42' or in operations where transverse rigidity of said frame is not necessary, the lock plates 254 are lowered by suitable operation of cylinders 276.

The ejecting foot serves to remove the blades 218 from a stump if necessary as explained hereinbefore. In addition, the knife edges 228 and 234 serve to cut the stump into segments, and further yet, the knife edges 234 and 236 are operable in conjunction with the ejecting foot 202 to cut up stump parts or trash. More particularly, trash or stump parts which are engaged in the area between edges 234, with the blades closed and the ejector foot up, can be reduced to a smaller size by holding the material between the blades in this area and forcefully extending the ejecting foot by actuation of cylinder 198. The bifurcated portions 208 of the ejecting foot pass on opposite sides of the blade edges 234 and thus completely cut any material in this area of the blades against said edges as well as against edges 236. FIG. 9 shows the blades closed in phantom lines and the ejecting foot down in full lines, such position illustrating a position of the parts which would exist where the ejecting foot has completed a cut on material against the edges 234 and 236. Therefore, not only is the present apparatus usable as a stump splitter and remover but also is capable of reducing stump parts, logs, trash, etc.

It is to be understood that the forms of my invention herein shown and described are to be taken as preferred examples of the same and that other changes in the shape, size and arrangement of parts may be resorted to without departing from the spirit of my invention or the scope of the subjoined claims.

Having thus described my invention, I claim:

1. A stump splitter comprising
   a. an elongated supporting frame having a substantially full length straight line configuration and having opposite ends,
   b. means arranged to support said frame on a supporting vehicle,
   c. a pair of arms pivotally supported in suspended relation on said frame,
   d. said arms having opposed splitting blade edges with substantially the full length of the edges being disposed in a plane below the lowest point of the supporting frame,
   e. and operating means for pivoting said arms,
   f. said operating means being arranged to pivot said arms apart so that the latter can straddle a stump and also being arranged to pivot said arms forcefully together to split the stump.

2. The stump splitter of claim 1 wherein said supporting frame comprises an inverted channel-shaped member,
   b. said arms being pivotally attached to an upper portion of said frame for accomplishing said movement thereof,
   c. said operating means for pivoting the arms comprising double acting cylinders connected at one of their ends to respective ends of said frame and at their other ends to said arms at about the upper end of said splitting blade edges.

3. The stump splitter of claim 1 wherein said arms have a bottom downwardly directed sharpened edge to facilitate insertion into the ground whereby the splitting blade edges are arranged to engage the stump below ground level.

4. The stump splitter of claim 1 wherein the splitting blade edges of said arms are arranged at an upright angle such that when the said arms are pivoted to an inner splitting position the splitting blade edges are substantially parallel and are substantially together.

5. The stump splitter of claim 1 wherein said frame includes guide means therein for guiding said arms in their pivotal movement so as to maintain them in a nontwisting opposing direction.

6. The stump splitter of claim 1 including a vertically movable power ejecting member on said frame arranged to drive the latter up to remove said splitting blade arms from a stuck position in a stump.

7. A stump splitter comprising
   a. an elongated supporting frame including an inverted channel-shaped member of substantially full length straight line configuration,
   b. means arranged to support said frame on a supporting vehicle,
   c. a pair of arms pivotally supported on said frame in suspended relation,
   d. said arms having lower opposed splitting blade edges for splitting a stump and upper splitting blade edges for cutting trash and the like,
   e. and double acting cylinders connected at one of their ends to respective ends of said frame and at their other ends to said arms for pivoting said arms,
   f. said operating means being arranged to pivot said arms apart so that the latter can straddle a stump and also being arranged to pivot said arms forcefully together to split the stump.

8. The stump splitter of claim 7 wherein the upper splitting blade edges are offset outwardly from said lower splitting blade edges and form shoulders therebetween, said shoulders being sharpened into upwardly facing cutting edges, and a vertically movable ejecting member on said frame arranged in one function thereof to engage the top of a stump to drive said frame up to remove said arms from a stuck position in the stump and in another function thereof to drive material to be reduced in size against said upper splitting blade edges and said upwardly facing cutting edges.

9. A stump splitter comprising
   a. a longitudinally disposed header arranged to be mounted on a supporting vehicle,
   b. an elongated supporting frame having opposite ends,
   c. mounting means supporting said frame on said header, d. said mounting means including a vertical axis pivot connection between said frame on said header,
e. means for pivoting said frame on said pivot axis,
f. lock means releasably engageable between said header and said frame arranged in a locked position thereof to hold said frame in a fixed position transversely of said header,
g. a pair of arms pivotally supported in suspended relation on said frame,
h. said arms having opposed splitting blade edges at their lower ends,
i. double acting cylinders connected at one of their ends to respective ends of said frame and at other ends to said arms for pivoting said arms,
j. said double acting cylinders being arranged to pivot said arms apart so that the latter can straddle a stump and also being arranged to pivot said arms forcefully together to split the stump.

10. The stump splitter of claim 9 wherein said mounting means also includes a transverse pivot connection between said frame and said header whereby said frame can be pivoted forward and backward to assist in removing stump segments that have been formed by the splitting action, and means for pivoting said frame on said pivot connection.

11. A stump splitter comprising
a. a longitudinally disposed header arranged to be mounted on a supporting vehicle,
b. an elongated supporting frame having opposite ends,
c. mounting means supporting said frame on said header,
d. said mounting means including a transverse axis pivot connection between said frame and said header,
e. means for pivoting said frame on said pivot axis,
f. a pair of arms pivotally supported in suspended relation on said frame,
g. said arms having opposed splitting blade edges at their lower ends,
h. and power operated means on said frame arranged to pivot said arms apart so that the latter can straddle a stump and also arranged to pivot said arms forcefully together to split the stump.

* * * * *